Aug. 6, 1940.  R. WENDEL  2,210,391
ILLUMINATING SYSTEM
Filed Dec. 8, 1937  3 Sheets-Sheet 3
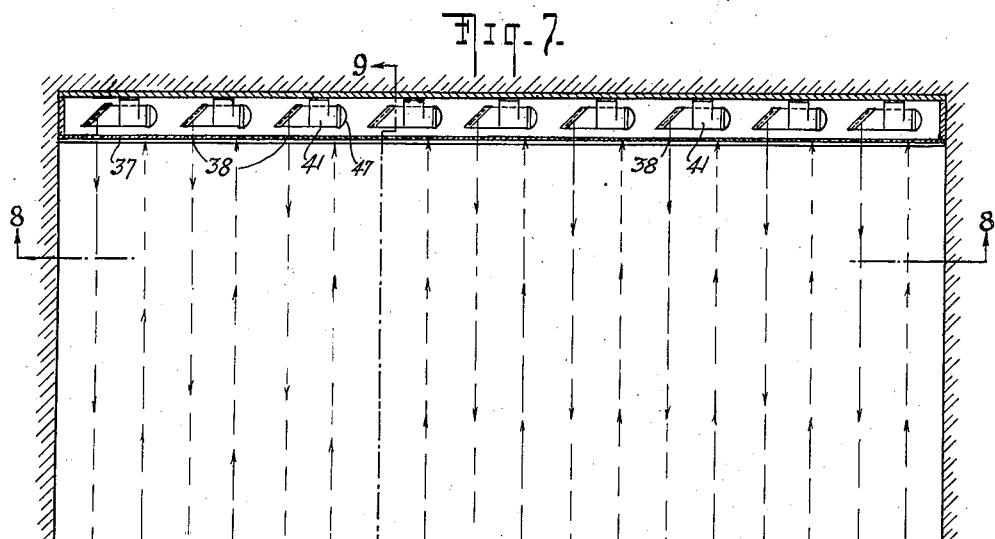

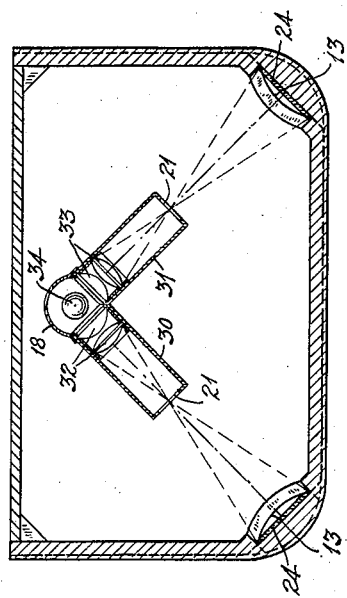
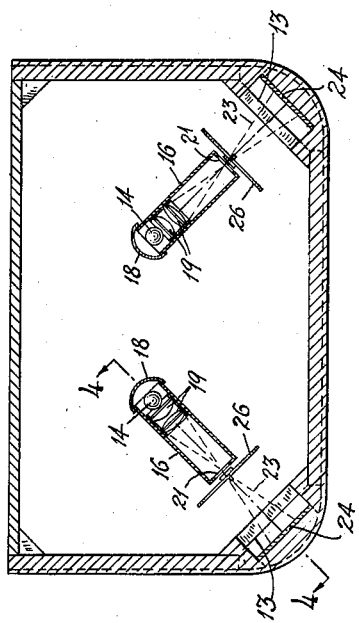
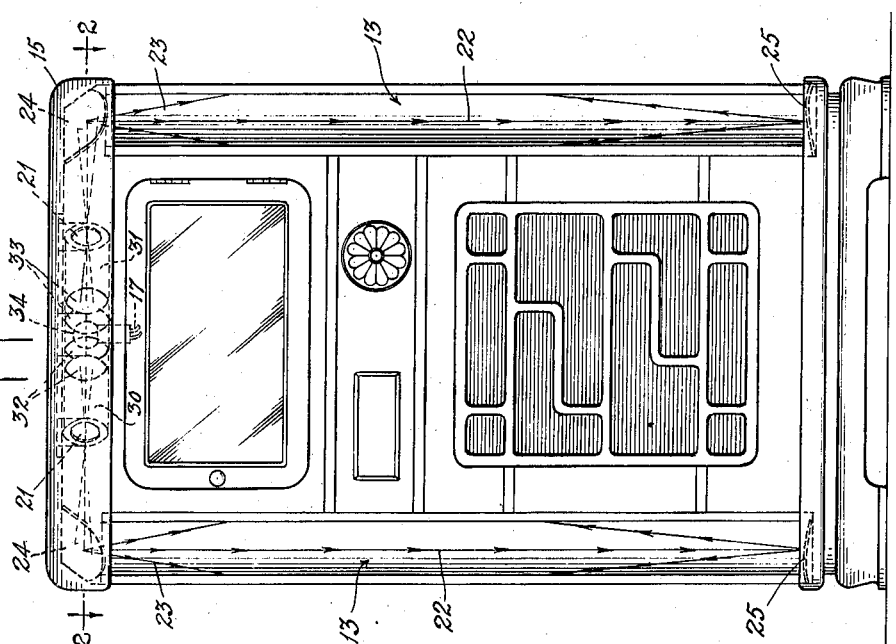

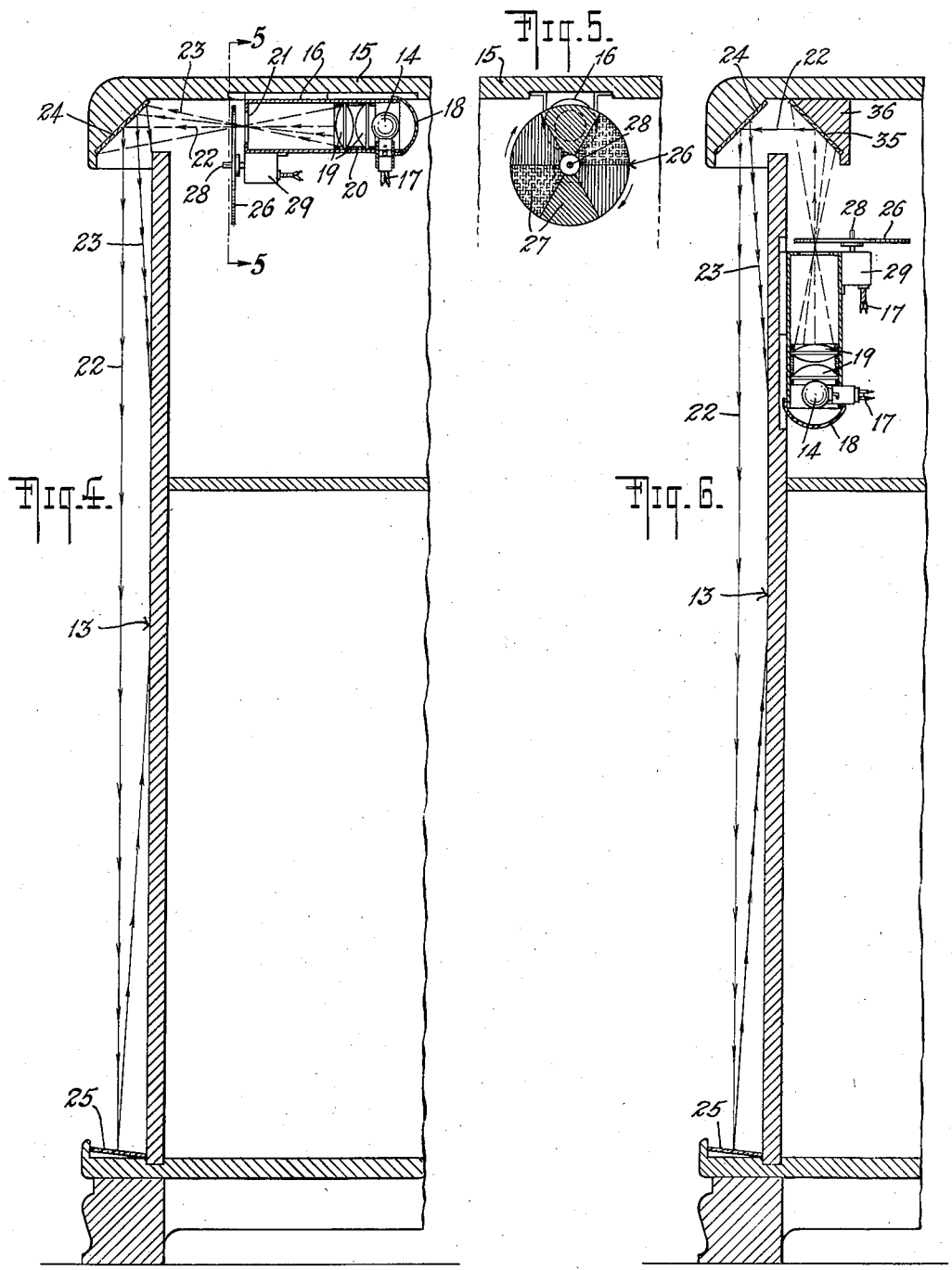

Patented Aug. 6, 1940

2,210,391

UNITED STATES PATENT OFFICE 2,210,391

ILLUMINATING SYSTEM

Rudolf Wendel, Roslyn Heights, N. Y.

Application December 8, 1937, Serial No. 178,638

3 Claims. (Cl. 240—9)

The present invention relates to a system of illumination and more particularly to apparatus designed and adapted for the illumination of an elongated area or elongated sections of a large surface, for instance, a wall, ceiling, or floor, whereby a substantially uniform illumination of such elongated area or of such sections, and therefore of the large surface, is secured.

It is a primary object of the present invention to provide a system for the illumination of an elongated area, such as a long, comparatively narrow stretch of wood, marble, composition material, or any other similar facing or veneer surface, for instance, such as is used in the corner molding of a radio or similar cabinet, or upon an entrance column or wall panel. The objects of the invention are secured with equally good results, upon flat or curved surfaces and upon surfaces of large extent by the breaking up of such surfaces into elongated areas to the illumination of each of which my novel system and apparatus may be applied.

A more specific object of the invention is to provide a system of illumination which results in the imparting of a substantially uniform and hence evenly distributed degree of illumination to an elongated area by the breaking up of the beams of light emanating from the source and causing certain of such beams of light to impinge directly upon a portion of the surface to be illuminated, and the remaining portions of the light to impinge upon the remaining portion of the surface to be illuminated after being reflected from a mirror appropriately positioned in the illuminating system.

My novel system of illumination is applicable with equally good results in the art of store or show-room lighting, for instance, the illumination of the ceiling, walls, and floor thereof, in the securement of an artistic effect in the illumination of advertising displays positioned within the establishment, and for the illumination of entrance columns, cornices, or panels of any configuration.

A feature of my novel illuminating system is that it utilizes elements of an illuminating apparatus which do not, to any appreciable extent, extend upwardly of the area to be illuminated. It may, therefore, be used with facility and without loss of valuable illumination, upon panels, columns, or similar elongated areas extending substantially throughout the height of a room, cabinet, or other enclosed area.

In accordance with one embodiment of my invention, hereinafter to be described, various artistically effective results may be secured by the use of colored filters applied by means of a revolving disc positioned immediately in front of the source of light, so that a series of colors, or any combination of a series of colors, may be produced and played upon the area to be illuminated.

In its broadest aspect, my novel illuminating system includes a light source, the rays of light from which are concentrated to a narrow beam through the application of a mirror and a number of lenses comprising a condenser system. The narrow beam of light thus produced is surrounded by a zone of diffused light utilized for the illumination of the portion of the elongated area to be lighted which is nearest to the source of light, while the narrower, concentrated beam, after reflection from a suitably disposed mirror, serves to illuminate the remaining expanse of the elongated area.

Thus, in accordance with my invention, the rays of light emanating from the source, in the instance in which the elongated area to be illuminated is disposed vertically, extend in a horizontal direction and impinge upon the reflecting surface of a mirror positioned at approximately 45° to the vertical. Such mirror is preferably positioned at the top of the elongated area to be illuminated, although it, and the source of light, may be positioned advantageously at the bottom thereof. In accordance with my structure, a second mirror is positioned at the other end of the surface to be illuminated, disposed at an angle of approximately 90 degrees to such surface. This second mirror receives the light from the first mirror and directs it backwardly toward the surface to be illuminated, so that a portion of the elongated surface, as of a panel, to be illuminated, receives its light from one mirror and the remaining portion from the other mirror, the panel being thus lighted uniformly and evenly.

My novel illuminating system may be used with equally good results in the illumination of a horizontally disposed surface, such as a ceiling or a floor, the particular embodiment of the system illustrated and described hereinafter constituting a system in which sources of light and the mirrors are positioned in staggered relation along the opposite edges of the surface to be illuminated, the principle of the invention being applied in the same manner for the securement of a uniform and even illumination of the surface by the breaking up of the plurality of beams from the plurality of light sources, so as to have a portion of such beams illuminate portions of the surface and the remaining portions of the beams illuminate the remaining portions of the surface.

Specific embodiments of my novel illuminating system are illustrated in the accompanying drawings in which Figs. 1-6, inclusive, show the application of my inventive structure and system to the illumination of an elongated area such as the corner molding of a radio, phonograph, or similar cabinet, while Figs. 7-12, inclusive, illustrate the embodiment of the invention as applied to the illumination of a surface such as a ceiling, wall, or floor, of a room.

In such drawings, Fig. 1 is a front elevation of an automatic phonograph cabinet, to which my inventive structure has been applied, for the purpose of illuminating the corner moldings thereof; Fig. 2 is a section along the line 2—2 of Fig. 1; Fig. 3 is a section similar to Fig. 2 but showing an embodiment of the invention in which two independent sources of light are used instead of the single source shown in Figs. 1 and 2; Fig. 4 is a section along the lines 4—4 of Fig. 3; Fig. 5 is a section along the line 5—5 of Fig. 4; Fig. 6 is a vertical section similar to Fig. 4 but showing a modified form of the invention, in which the light source and related elements are positioned and disposed vertically, instead of horizontally, within the cabinet; Fig. 7 is a plan view of my novel system of lighting as applied to the uniform illumination of an expanse of ceiling; Fig. 8 is a section along the line 8—8 of Fig. 7; Fig. 9 is a section along the line 9—9 of Fig. 7; Fig. 10 is an enlarged detail of one of the light sources utilized in the ceiling illuminating system; Fig. 11 is a section along the line 11—11 of Fig. 10; and Fig. 12 is a horizontal section through the light source illustrated in Fig. 10.

Referring more particularly to the drawings, in which similar reference characters identify similar parts in the several views, the elongated area to be illuminated is designated generally as 13 which, in the embodiments of the invention illustrated in Figs. 1-6 inclusive, constitutes a vertically disposed corner molding of a phonograph cabinet. A source of light 14 is positioned within the cabinet, preferably secured to the upper inner surface of the cabinet cover 15 by means of a tubular housing 16. The source of current for the light source is led from the electric connections included in the cabinet by means of wires 17. A spherical reflector 18 is preferably arranged rearwardly of the light source. A condenser system 19, in the form of a plano-convex and a double convex lens, is positioned forwardly of the light source, the lenses being secured within a sleeve 20 within the tubular housing 16. The housing at its end remote from the light source is provided with an aperture 21 through which the rays of light emanating from the light source pass in an intense central beam focused by the condenser system, such intense central beam 22 being surrounded by a diverging annular beam 23 of lower light intensity.

Immediately above, and a short distance in front of, the elongated area 13 to be illuminated, is arranged a mirror 24, disposed at an angle of 45° to the vertical, upon which the beams of light emanating from the light source and passing through the aperture 21 are directed. The rays of the annular beam 23, of lower intensity, are reflected by the mirror 24 upon the upper portion of the area 13 to be illuminated. The central, more intense, beam is reflected from the mirror 24 upon the surface of a mirror 25 positioned and arranged adjacent to and in front of the bottom of the area 13, the mirror 25 being inclined slightly to the horizontal. In the drawings, I have shown the degree of inclination of such mirror exaggerated for clarity, it being understood that a very slight inclination of such mirror is sufficient for the attainment of the desired result. The mirror 25 is effective, as clearly shown in the drawings, to reflect the light from the concentrated beam 22 to and upon the lower portion of the area 13.

The result of the above arrangement is the securement of a substantially uniform degree of illumination substantially throughout the surface of the elongated area 13.

In order to secure a novel artistic effect of a play of colored lights, and to secure the illumination of the elongated area 13 by such colored lights, I may conveniently provide, in the system, a color wheel 26, segments of which may be constituted of filters 27 of different colors, the filters being made of glass, Cellophane, or similar colored translucent material. The wheel or disc 26 is secured upon a shaft 28 of an electric motor 29, conveniently secured to the bottom of the tubular housing 16 so as to have the wheel or disc revolve in front of the aperture 21 with its segments of different colors being sequentially positioned in front of such aperture, upon rotation thereof by the motor 29.

It will be understood, of course, that the elongated area 13 to be illuminated may be constituted of wood, composition material, or any similar paneling or surfacing material.

The above described arrangement is that specifically shown in Figs. 1, 3, 4, and 5, with an independent light source being utilized for each of the two panels of the cabinet. What has been described hereinabove with respect to one of such systems of illumination is to be understood as being reproduced at the other side of the cabinet for the purpose of uniformly and evenly illuminating the other corner panel of such cabinet. Such a duplex system is shown in Fig. 3.

In Fig. 2, the same type of illuminating system is illustrated with the slight difference that instead of using two separate and independent sources of light, a single source of light may be utilized, such single source of light being positioned within the cabinet in such manner as to be effective to illuminate, in the manner indicated, both of the corner moldings or panels of the cabinet. In such embodiment, the housing is constituted of two tubular sections 30 and 31 disposed at right angles to each other and directed toward the upper edge of the corner moldings of the cabinet. In such embodiment, each tubular element of the housing contains its individual condenser system 32 and 33 which are individually effective to focus the light from the light source 34 toward the mirrors at the top of the two areas to be illuminated. In the case of utilizing a single light source for the illumination of both corner moldings of the cabinet, such light source, of course, should be positioned centrally within the cabinet and sufficiently toward the rear wall thereof to permit the focusing of the rays of light emanating therefrom, through the apertures in the two tubes, toward the two mirrors.

In Fig. 6 I have illustrated a slightly modified embodiment of my inventive structure, in which the light source and the tubular housing containing the same and the condenser system are disposed upon, and secured to, the inner side wall of the cabinet which constitutes the rear inner surface of the wall of which the outer surface is the elongated area to be illuminated. In such embodiment of my invention I use an intermediate mirror 35 disposed at an angle of 45° and secured to a molding 36 depending from the top or cover member of the cabinet. The beams of light emanating from the light source are in this embodiment first directed against the mirror 35 and then reflected from such mirror to the mirror 24. This embodiment of my invention structure is particularly adaptable to a cabinet in which there is not sufficient space above the mechanism housed within the upper portion of the cabinet to permit the light source and associated elements to be disposed as illustrated in Fig. 4, but there is sufficient space contiguous the inner sides of the cabinet to support such mechanism as illustrated in Fig. 6.

The embodiment of my invention, as applied to effect the uniform and even illumination of an expanse of surface such as a ceiling, floor, or the walls of a room, shop, or similar establishment, is illustrated in Figs. 7-12 inclusive. In such embodiment, my novel illuminating apparatus is disposed so as to have a series of light sources and their associated housings, condenser systems, and mirrors positioned along one edge or side of the surface to be illuminated, and another series of such mechanism along the opposite edge or side of such surface, the two series of light sources and associated parts being disposed oppositely and in staggered relation along the stretches of the surface to be illuminated as hereinafter more fully described.

Along each side wall are positioned panels, into which are placed continuously disposed mirrors 37, each having two apertures 38. Rearwardly of each mirror 37 are positioned two sources of light 39 supported upon the side walls by bracket 40. Secured by each of such brackets is a housing 41 which contains the light source 39, the condenser system 42, which is likewise in the form of a plano-convex and double convex lens, and a mirror 43 disposed at an angle of 45° and secured to a similarly disposed extension 44 of the housing 41 so as to be removable therefrom by sliding it out of the extension, for cleaning.

As shown clearly in Fig. 7, the series of light sources along one edge of the surface to be illuminated are disposed so as to have the beams of light emanating from the light source impinge against the mirrors 43 and to be reflected therefrom in two beams, one of which, the annular beam 45 (see Fig. 9) is effective to illuminate one portion of the surface to be lighted and the other beam, the intense central beam, 46, being effective to illuminate the remaining surface of the area to be illuminated. Both of these beams pass through the aperture 38, the concentrated beam 46 being directed by the mirror 43 against the opposite edge of the area to be illuminated, impinging against the mirror 37 disposed at a slight angle to the vertical (see Fig. 9) and to be reflected therefrom at an angle so as to illuminate the far portion of the surface to be lighted.

It will be noted from Fig. 10 that a reflector 47 is provided upon the housing 41, such reflector having a bayonet joint 48 whereby the reflector may be removed, for instance, for the installation or replacement of the lamp 39.

The series of light sources and associated parts disposed along the opposite edge of the surface to be illuminated, operate substantially in the same manner, the two beams of light passing through the aperture 38 in the mirrors 37 positioned in front of such sources of light and illuminating, one-half of the surfaces to be lighted, by the annular beam, and the other half by the concentrated beam reflected from the mirror at the opposite edge of the surface to be lighted. It will be noted that the two series of light sources are disposed along the opposite edges of the area to be illuminated in staggered relation with the reflecting mirrors, disposed at 45°, of one series being to the left of the light source, as viewed in Fig. 7, and the mirrors of the other series being to the right of the light sources. In this manner a uniform and substantially even illumination of a large expanse or area is procured.

While I have described specific embodiments of my invention, it is to be understood that various modifications therein, particularly in the arrangement of the several component parts thereof, may be made for the adaption of the system to the illumination of a particular area, whether long and narrow or expansive in lateral surface measurement. Also, while I have described specific embodiments and particular applications of my invention, it is to be understood that it may be applied with equal facility to the illumination of areas other than those specifically mentioned, for instance, for the illumination of advertising displays and similar devices. Thus, while the embodiment of my invention illustrated in Figs. 7-12 is particularly adapted for the illumination of low ceilings, for instance, in shows or display rooms, it is obvious that it may be utilized for the illumination of vertical walls as well as floors. It is to be understood, therefore, that the showing and description is by way of illustration of particular applications of my invention, rather than by way of limitation.

I claim:

1. An apparatus for illuminating an elongated area so as to effect a substantially uniform lighting of the surface of such elongated area, comprising a source of light positioned rearwardly of the area to be illuminated and so as not to extend to any substantial extent upwardly of the area to be illuminated, a housing for said source of light, a reflector positioned rearwardly of the light source, a condenser system constituted of a plurality of lenses positioned forwardly of the light source, said housing having an aperture in its end removed from the light source, a mirror positioned forwardly and upwardly of the elongated area and inclined at an angle of substantially 45° to said area, a second mirror positioned forwardly of the elongated area near the other end thereof, said second mirror being inclined slightly less than 90° to the elongated area, whereby the rays of light emanating from the light source are divided by said condenser system into a narrow concentrated beam and an annular zone of diffused light, the former being reflected by both of said mirrors so as to effect the lighting of the portion of said elongated area adjacent the second mirror, and the latter, upon reflection from said first named mirror, effecting the illumination of the portion of the elongated area adjacent to such mirror.

2. An apparatus for illuminating an elongated area so as to effect a substantially uniform lighting of the surface of such elongated area comprising a source of light positioned rearwardly of the area to be illuminated and so as not to extend to any substantial extent upwardly of the illuminated area, a housing for said source of light, a reflector positioned rearwardly of the light source, said housing having an aperture in its end removed from the light source, a mirror positioned forwardly and beyond one end of the elongated area and inclined at an angle of substantially 45° to said area, a second mirror positioned forwardly of the elongated area near the other end thereof, said second mirror being inclined slightly less than 90° to the elongated area, portions of the rays of light emanating from said light source being reflected first by one and then the other of said mirrors so as to effect the lighting of the portion of said elongated area adjacent the second mirror, and the remaining portions of the rays, upon reflection from said first named mirror, effecting the illumination of the portion of the elongated area adjacent to such mirror.

3. A system of illumination for lighting an elongated surface area, including a source of light, a reflector positioned rearwardly of said source, a housing for said light source, a condenser system constituted of a plurality of lenses positioned within said housing forwardly of the source of light, the source of light and associated parts being positioned rearwardly of the surface to be illuminated, whereby the rays emanating from said source are divided into a narrow concentrated beam and an annular zone of diffused light, a mirror disposed in proximity to said light source and to the area to be illuminated, serving to reflect the annular beam of diffused light upon one section of the area to be illuminated and to reflect the narrow concentrated beam in a path substantially parallel to the elongated area to be illuminated, a mirror positioned near the far end of the area to be illuminated and disposed at an angle slightly less than 90° thereto, whereby the narrow concentrated beam of light is reflected from said mirror and serves to illuminate the remaining portion of the elongated area, whereby a substantially uniform illumination of such elongated area is secured.

RUDOLF WENDEL.